March 15, 1966 O. J. McCABE 3,241,047
REMOTELY CONTROLLED ADJUSTABLE VOLTAGE CIRCUIT
Filed Aug. 13, 1962
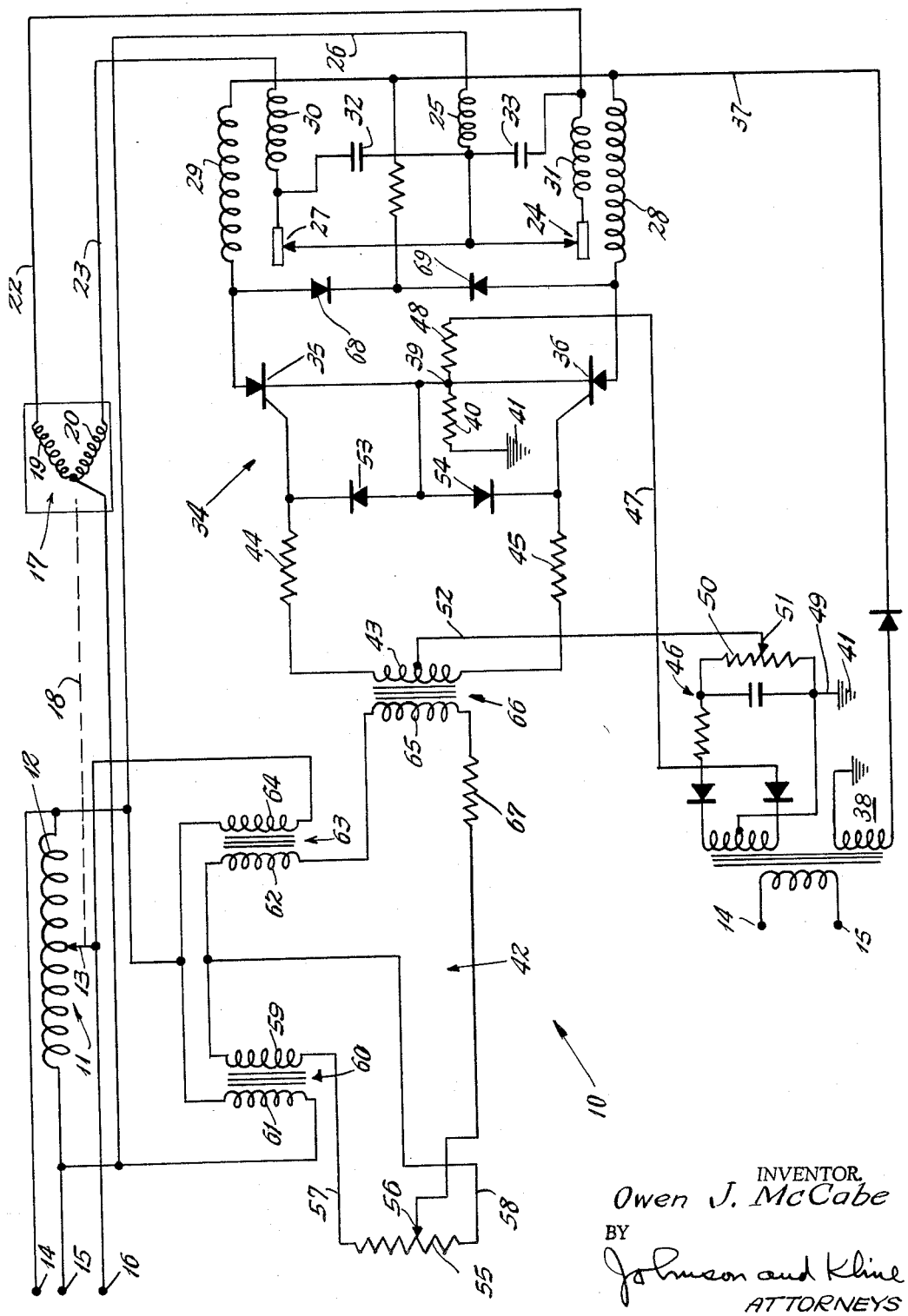
INVENTOR.
Owen J. McCabe
BY
Johnson and Kline
ATTORNEYS United States Patent Office 3,241,047
Patented Mar. 15, 1966

3,241,047
REMOTELY CONTROLLED ADJUSTABLE
VOLTAGE CIRCUIT
Owen J. McCabe, Bristol, Conn., assignor to The Superior Electric Company, Bristol, Conn., a corporation of Connecticut
Filed Aug. 13, 1962, Ser. No. 216,678
9 Claims. (Cl. 323—43.5)

The present invention relates to a circuit that is connectible to a source of electrical energy for producing an adjustable output voltage and more particularly to such a circuit in which the output voltage may be adjusted from a remote position.

While it has been heretofore proposed to provide an adjustable voltage circuit with a controller that is remotely positioned from the other components of the circuit, such circuits have not been found to be heretofore completely satisfactory. Such circuits have generally included an adjustable voltage circuit, such as an adjustable autotransformer, and a means for mechanically adjusting the autotransformer to obtain the desired output voltage. The remote controller also has generally been capable of being remotely positioned from the autotransformer and its adjusting means. However, these prior circuits required that the connections between the controller and the adjustable voltage circuit have not been electrically isolated from the voltage circuit controlled by the autotransformer and at a substantially lesser voltage. In addition, there have been mechanical parts which were required to be driven in timed relation with the autotransformer parts. These requirements have thus prevented such prior circuits from being completely satisfactory.

It is accordingly an object of the present invention to provide a remotely controllable adjustable voltage circuit of the above type in which mechanical interconnections and moving parts are substantially minimized and in which only a few electrical connections are required between the remote controller and the other components of the circuit.

Another object of the present invention is to provide for electrically isolating the remote controller from the electric energy whose voltage is adjustably controlled and in which only a small voltage signal is required between the remote controller and the other components of the circuit.

A further object of the present invention is to provide an adjustable remotely controllable voltage circuit which is simple in construction and durable in use and which maintains the output voltage at its adjusted value.

A feature of the present invention resides in providing an adjustable voltage autotransformer mechanically movable by a reversible motor so that energization of one path to the motor provides for an increase in the output voltage from the autotransformer while energization through another path provides for a decrease in the autotransformer output voltage. For energization of one or the other of the paths, there is provided relays operated by a phase controlled circuit which in turn is rendered responsive to a signal for selecting which path is to be energized if the output voltage needs adjusting.

The signal for the phase control circuit is derived from a comparison circuit and according to the present invention this circuit includes an adjustable potentiometer that is remotely positioned from the other components of the circuit and across which is placed a substantially constant voltage of reduced value. The tap of the potentiometer provides for selecting a value of voltage which is related to the value which the output voltage is desired to have and this voltage is compared against a voltage that is proportional to the actual value of output voltage. The difference of the two voltages, which occurs when the output voltage is different than that desired, is a signal that indicates both the value of the difference and which is the higher voltage and is employed to actuate the phase control circuit for causing the output voltage to be adjusted.

Thus, according to the present invention the adjustable potentiometer constitutes the adjustable output voltage controller and is positionable remote from the other components requiring only three leads to the controller. Moreover, the potentiometer is electrically isolated from the output voltage controlled and in addition only a small voltage appears in the leads to the controller.

Other features and advantages will hereinafter appear.

In the drawing, the only figure is a schematic diagram of the remotely controllable adjustable voltage circuit of the present invention.

Referring to the drawing, the circuit of the present invention is generally indicated by the reference numeral 10 and includes an adjustable voltage autotransformer 11 having a winding 12 on which a tap 13 is movable, slidable in electrical engagement therewith, as is well known in the art. The ends of the winding 12 are connected to a pair of input terminals 14 and 15 which in turn are connectible to an input source of alternating current while the output of the autotransformer is between the terminal 14 and a terminal 16 connected to the tap 13. Movement of the tap 13 on the winding 12 is controlled by an electric motor, generally indicated by the reference numeral 17 which is mechanically connected, as indicated by the dotted line 18, to move the tap 13. The motor 17 is of the reversible type such as disclosed in U.S. Patent No. 2,982,872, and includes a first winding 19 and a second winding 20 with the windings having a common junction lead 21 connected to the terminal 15. A first path 22 connected to the winding 19 which when energized, provides for rotation of the motor in one direction and a second path 23, which upon energization, rotates the motor in the other direction. It will, of course, be appreciated that rotation of the motor by energization of the path 22 serves to increase the output voltage at the terminals 14 and 16 while energization of the path 23 decreases the output voltage.

The path 22 is energized through a relay contact 24 which through a R.F. choke 25 is connected by a lead 26 to the terminal 14. Similarly, the path 23 includes a relay contact 27 also connected to the lead 26.

The relay contact 24 is controlled by a relay coil 28 which, upon energization, closes the contact while the relay contact 27 is controlled by a relay coil 29, also which, upon energization, closes the contact 27. It will be appreciated that closure of the contact 27 energizes the path 23 across the input terminals while closure of the contact 24 by energization of the relay coil 28 energizes the path 22. For decreasing sparking and R.F. interference chokes 30 and 31 and condensers 32 and 33 connected in the manner shown are provided.

The energization of the relay coils 28 and 29 is effected by a phase control circuit, generally indicated by the reference numeral 34 which includes a first silicon controlled rectifier (SCR) 35 and a second SCR 36. The SCRs are normally non-conducting in their anode-cathode path but upon triggering render their anode-cathode path conducting. The relay coil 29 is energized upon conduction of the SCR 35 and the relay coil 28 is energized upon conduction of the SCR 36. Accordingly, the relay coil 29 is connected between the anode of the SCR 35 and a lead 37 while relay 28 is connected between the anode of SCR 36 and the lead 37. The lead 37 is a positive lead of a half-wave power supply, generally indicated by the reference numeral 38 which is connected to the output terminals 14 and 15 to provide half-wave unidirectional current that is in synchronism with the alternating current supplied to the input terminals. The cathodes of the SCR are connected to a common point 39 which through a resistor 40 is connected to a ground 41 as is the negative side of the half-wave rectified power supply 38.

Each of the SCRs 35 and 36 is triggered into a state of conduction by a signal which is obtained from a comparison circuit, generally indicated by the reference numeral 42, as will hereinafter be explained and this signal is impressed upon a center-tapped winding 43 having one end connected through a resistance 44 to the gate of the SCR 35 while the other end of the winding is connected through a resistance 45 to the gate of the SCR 36.

A source of full-wave rectified current is obtained from a full-wave rectifying power circuit 46 connected to receive an alternating current from the input terminals 14 and 15 having a negative lead 47 connected through a resistance 48 to the common point 39 while the positive lead 49 is connected to the ground 41. In addition, the full-wave rectifying power circuit 46 includes an adjustable potentiometer 50 having a tap 51 connected to the center tap of the winding 43 by a lead 52 such that the potential existing between the point 39 and the gate of each SCR may be adjusted. The value is not sufficient to cause a triggering of the SCRs. The phase controlled circuit 34 also includes diodes 53 and 54 connected as shown for preventing reverse biasing of the gate cathode circuits of the SCRs.

The comparison circuit, according to the present invention, includes an adjustable potentiometer 55 having a movable tap 56 with the potentiometer constituting the output voltage controller and is remotely positionable from the other components of the circuit. Connected across the potentiometer 55 by leads 57 and 58 is a secondary winding 59 of a transformer 60 having a primary winding 61 connected across the input terminals 14 and 15. It will be appreciated that with this structure a substantially constant voltage preferably, according to the present invention, substantially reduced in value from the voltage across the terminals 14 and 15 is impressed upon the potentiometer. Connected between the tap 56 and the lead 58 is a winding 62 of a transformer 63 having a primary winding 64, the latter being connected between the output terminal 14 and the tap 13 to have the output voltage therebetween impressed upon the winding 64. The transformer 63 is preferably a step-down transformer so that the voltage across the winding 62 is of substantially lower value than the output voltage yet is proportional thereto. The winding 62 is connected in series with a winding 65 of a transformer 66 whose secondary winding 43 is in the phase control circuit 34 with a current limiting resistor 67.

With the above disclosed structure it will be appreciated that the potentiometer 55 has a constant voltage impressed thereacross by the winding 59 and that the voltage between the lead 58 and tap 56 may be adjusted by moving the tap 56 to provide an adjustable substantially constant voltage. Opposing the voltage between the tap 56 and lead 58 is the voltage produced in the winding 62 which is directly proportional to the output voltage. Accordingly, with the two voltages being equal, there is no difference therebetween and hence no current flows through the winding 65 by a path consisting of the tap 56, resistor 67, winding 65, winding 62 and end 58. However, if the output voltage becomes higher than that selected by the setting of the tap 56, the voltage between the tap 56 and the lead 58 will be less than the voltage produced by the winding 62 and hence an A.C. current will flow in the winding 65 with the resistor 67 limiting the amount of current. The current will be proportional to the magnitude of the difference in the two voltages and will be in phase with the A.C. supplied to the input terminals 14 and 15. Conversely, if the output voltage is lower than that set by the potentiometer 55, the voltage between the tap 56 and lead 58 will be higher than the voltage produced in the winding 62 and hence A.C. current will flow in the winding 65, with its value being indicative of the magnitude of the difference between the two voltages and by it being out-of-phase with the A.C. at the terminals 14 and 15 also being indicative that the output voltage is too low.

The phase controlled circuit 34 accepts the signal from the comparison circuit in the winding 43 and with in-phase voltage signal produces across the gate-cathode path of SCR 36 a triggering signal which is of a magnitude which when added to the potential produced by the leads 52 and 47 in the gate-cathode path causes firing of the SCR 36 and consequent energization of the relay 28, closure of the contact 24, and energization of the path 23 to thereby cause a decrease in the output voltage until such time as the magnitude of the voltage across the winding 62 is substantially identical to the voltage between the tap 56 and lead 58. Conversely, for out-of-phase signal the SCR 35 is rendered conducting in its gate-cathode path, effecting closure of contact 27 and energization of the path 22 to cause movement of the tap 13 of the autotransformer to increase the output voltage until its value produces a balance between the value of voltages in the windings 59 and 62.

With the above structure it will be appreciated that there are only three leads which are required to connect the remote controller to the other components of the circuit. These leads carry a voltage which is much smaller, i.e. may be on the order of 24 volts, when the voltage controlled by the autotransformer 11 is 115 volts, and by having current flow only when the two voltages are out of balance, any voltage drop which occurs in the leads caused by the remoteness of the controller is substantially minimized. Moreover, the transformers 60 and 63 serve to electrically isolate the remote controller from the power voltage controlled by the autotransformer.

The potentiometer 50 is employed to vary the potential in the gate-cathode circuit of the SCRs 35 and 36 to this end it will be understood that by so doing it adjusts the sensitivity of the phase control circuit to the magnitude of the voltage of the signal from the comparison circuit and thus is a sensitivity adjustment of the circuit 10. It accordingly is employed to delineate the range of magnitude of the input signal and hence the amount that the output voltage may differ from that value set by the controller which will not cause energization of the motor.

It has been found that diodes 68 and 69 connected in the manner shown advantageously serve to delay the de-energization of relay coils 28 and 29 particularly as the energizing relay current is only half-wave rectified alternating current.

It will accordingly be appreciated that there has been disclosed an adjustable voltage control circuit which has the controller for adjusting the output voltage interconnected in such a manner that it will be easily separated and positioned remotely from the other components of the circuit. Moreover, only a minimum number of leads and no mechanical connections are required to be connected between the controller and the rest of the circuit and in these leads, according to the present invention, there is a much smaller voltage than that controlled by the circuit. In addition the number of moving parts in the circuit is substantially minimized being limited to just the motor driving just the sliding tap of the autotransformer.

Varations and modifications may be made within the scope of the claims and portions of the improvements may be used without others.

I claim:

1. An adjustable remote control voltage circuit comprising adjustable voltage means connectible to a source of alternating current for producing an output voltage, means connected to the adjustable voltage means having one path which upon energization increases the output voltage and another path which upon energization decreases the output voltage, proportional means connected to the voltage means for producing a voltage proportional to the output voltage, adjustable means for producing a substantially constant adjustable voltage, comparing means for comparing the two voltages to produce a signal indicative of the difference between the two-voltages both as to magnitude and sense and means responsive to the signal of the comparing means for energizing one path or the other to alter the output voltage to a value selected by the adjusting means to thereby substantially reduce the difference between the two voltages.

2. An adjustable remote control voltage circuit comprising adjustable voltage means connectible to a source of alternating current for producing an output voltage, means connected to the adjustable voltage means having one path which upon energization increases the output voltage and another path which upon energization decreases the output voltage, proportional means connected to the voltage means for producing a voltage proportional to the output voltage, adjustable means for producing a substantially constant adjustable voltage, comparing means for comparing the two voltages to produce a signal indicating the higher voltage and the value of difference between the two voltages and means responsive to the signal of the comparing means for energizing one path if one voltage is higher or the other path if the other voltage is higher to alter the output voltage to a value selected by the adjusting means to thereby substantially reduce the difference between the two voltages.

3. The invention as defined in claim 2 in which the one path energized when the adjustable means voltage is higher is the one path that increases the output voltage.

4. An adjustable remote control voltage circuit comprising adjustable voltage means connectible to a source of alternating current for producing an output voltage, means connected to the adjustable voltage means having one path which upon energization increases the output voltage and another path which upon energization decreases the output voltage, proportional means connected to the voltage means for producing a voltage proportional to the output voltage, adjustable means for producing a substantially constant adjustable voltage, comparing means for comparing the two voltages including connections placing the two voltages in opposition to produce a signal in the connections indicative of the difference between the two voltages both as to magnitude and sense and means responsive to the signal of the comparing means for energizing one path or the other to alter the output voltage to a value selected by the adjusting means to thereby substantially reduce the difference between the two voltages.

5. An adjustable remote control voltage circuit comprising adjustable voltage means connectible to a source of alternating current for producing an output voltage, means connected to the adjustable voltage means having one path which upon energization increases the output voltage and another path which upon energization decreases the output voltage, proportional means connected to the voltage means for producing a voltage proportional to the output voltage and including a step-down transformer having a primary winding connected to the output voltage and a secondary winding in which the voltage appears, adjustable means for producing a substantially constant adjustable voltage and including a step-down transformer winding connectible to the source of alternating current and a secondary winding in which the voltage appears, comparing means for comparing the two voltages including connections placing the two voltages in opposition to produce a signal in the connections indicating the higher voltage and the magnitude of the difference between the two voltages and means responsive to the signal of the comparing means for energizing one path if one voltage is higher or the other path if the other voltage is higher to alter the output voltage to a value selected by the adjusting means to thereby substantially reduce the difference between the two voltages.

6. The invention as defined in claim 5 in which the secondary winding of the adjustable means transformer is connected across an adjustable resistance having a tap movable to select the value of the adjustable voltage appearing between the tap and an end thereof.

7. The invention as defined in claim 6 in which the resistance is remotely positioned and the only connections to the resistance are three wires connected to the two ends and the tap.

8. An adjustable remote control voltage circuit comprising adjustable voltage means connectible to a source of alternating current for producing an output voltage, means connected to the adjustable voltage means having one path which upon energization increases the output voltage and another path which upon energization decreases the output voltage, proportional means connected to the voltage means for producing a voltage proportional to the output voltage, adjustable means for producing a substantially constant adjustable voltage and including a step-down transformer winding connectible to the source of alternating current and a secondary winding in which the voltage appears, and an adjustable resistor having a tap connected across the secondary winding to have a substantially reduced voltage placed thereacross with the adjustable voltage appearing between the tap and an end of the resistor, comparing means for comparing the two voltages to produce a signal indicative of the difference between the two voltages and means responsive to the signal of the comparing means for energizing one path or the other to alter the output voltage to a value selected by the adjusting means to thereby substantially reduce the difference between the two voltages.

9. An adjustable remote control voltage circuit comprising an adjustable voltage autotransformer connectible to a source of alternating current and having a movable slider for producing an adjustable output voltage, means connected to the adjustable voltage means and having one path which upon energization increases the output voltage by moving the slider in one direction and another path which upon energization decreases the output voltage by moving the slider in the other direction, each of said paths including a semiconductor and a relay, proportional means connected to the voltage means for producing a voltage proportional to the output voltage and including a step-down transformer having a primary winding connected to the output voltage and a secondary winding in which the voltage appears, adjustable means for producing a substantially constant adjustable voltage and including a step-down transformer winding connectible to the source of alternating current and a secondary winding in which the voltage appears, and an adjustable resistor having a tap connected across the secondary winding to have a substantially reduced voltage placed thereacross with the adjustable voltage appearing between the tap and an end of the resistor, comparing means for comparing the two voltages including connections placing the two voltages in opposition to produce a signal in the connections indicating the higher voltage and the magnitude of the difference between the two voltages and means responsive to the signal of the comparing means for energizing one path if one voltage is higher or the other path if the other voltage is higher to alter the output voltage to a value selected by the adjusting means to thereby substantially reduce the difference between the two voltages.

References Cited by the Examiner

UNITED STATES PATENTS

| | | | |
|---|---|---|---|
| 2,573,744 | 11/1951 | Trucksess | 323—54 X |
| 2,619,630 | 11/1952 | Stone | 323—45 |
| 2,747,157 | 5/1956 | Pinney | 323—43.5 |
| 2,830,255 | 4/1958 | De Blasio | 323—45 |
| 3,154,734 | 10/1964 | Pinney et al. | 323—43.5 |

LLOYD McCOLLUM, *Primary Examiner.*